United States Patent
Dukatz et al.

(10) Patent No.: US 6,264,281 B1
(45) Date of Patent: Jul. 24, 2001

(54) SEAT BELT BUCKLE PRETENSIONER MOUNTING MECHANISM

(75) Inventors: Matthew E. Dukatz, Bloomfield Hills; Christopher J. Pesta, Sterling Heights; William Mar, Clinton Township; Frederick R. Shaver, Troy, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/382,538

(22) Filed: Aug. 25, 1999

(51) Int. Cl.[7] .................. A62D 35/04; B60R 21/00; B60R 22/12; B60R 22/46
(52) U.S. Cl. .................. 297/480; 297/479; 280/806
(58) Field of Search .................. 297/480, 479; 280/806

(56) References Cited

U.S. PATENT DOCUMENTS

| | | | |
|---|---|---|---|
| 4,913,497 | | 4/1990 | Knabel et al. ............... 297/480 |
| 4,932,722 | * | 6/1990 | Motozawa ............... 297/480 |
| 4,999,004 | * | 3/1991 | Skanberg et al. ............... 297/480 |
| 5,149,134 | | 9/1992 | Fohl ............... 280/806 |
| 5,288,105 | * | 2/1994 | Ikegaya et al. ............... 297/480 X |
| 5,290,062 | * | 3/1994 | Fohl ............... 297/480 X |
| 5,299,830 | | 4/1994 | Hanna et al. ............... 297/480 X |
| 5,310,219 | * | 5/1994 | Fohl ............... 297/480 X |
| 5,313,690 | * | 5/1994 | Hiramatsu et al. ............... 297/480 X |
| 5,403,037 | | 4/1995 | Fohl ............... 297/480 X |
| 5,538,284 | * | 7/1996 | Nishide et al. ............... 297/480 X |
| 5,588,677 | * | 12/1996 | Kopetzky et al. ............... 297/480 X |
| 5,634,690 | * | 6/1997 | Watanabe et al. ............... 297/480 |
| 5,639,120 | | 6/1997 | Kmiec et al. ............... 280/806 |
| 5,671,949 | * | 9/1997 | Bauer et al. ............... 297/480 X |
| 5,707,080 | * | 1/1998 | Isaji et al. ............... 297/480 X |
| 5,782,492 | * | 7/1998 | Ojima et al. ............... 297/480 X |
| 5,788,025 | * | 8/1998 | Nishide et al. ............... 297/480 X |
| 5,871,236 | * | 2/1999 | Bauer et al. ............... 297/480 X |
| 5,873,599 | * | 2/1999 | Bauer et al. ............... 297/480 X |
| 5,887,897 | * | 3/1999 | Gill et al. ............... 297/480 X |
| 5,924,730 | * | 7/1999 | Burrow et al. ............... 297/480 X |
| 5,927,756 | * | 7/1999 | Wier ............... 297/480 X |
| 6,039,353 | * | 3/2000 | Bauer et al. ............... 297/480 X |
| 6,113,145 | * | 9/2000 | Evans ............... 297/480 X |

* cited by examiner

*Primary Examiner*—Peter M. Cuomo
*Assistant Examiner*—Rodney B. White
(74) *Attorney, Agent, or Firm*—Lawrence J. Shurupoff

(57) ABSTRACT

An automotive seat belt buckle pretensioner assembly includes a special mounting bracket for supporting the operating components of a pyrotechnic-powered cable extending from the seat belt buckle around a cable-redirection pulley. The mounting bracket includes a flat major wall that is parallel to a major wall on the pulley support structure, so that the pulley is located within the space defined by the parallel walls. A bolt, or rivet, extending between the parallel walls provides shaft support for the pulley, while acting as a connector mechanism between the pulley support structure and mounting bracket.

3 Claims, 3 Drawing Sheets

SEAT BELT BUCKLE PRETENSIONER MOUNTING MECHANISM

CROSS REFERENCE TO A RELATED PATENT APPLICATION

This patent application is related to a U.S. patent application filed by Christopher Pesta et al on May 26, 1999, Ser. No. 09/294,285, now U.S. Pat. No. 6,149,242.

The inventions disclosed in these patent applications utilize a common pyrotechnic power source and a common cable-pulley arrangement. The present invention discloses a different mounting mechanism than that disclosed in the earlier filed application.

BACKGROUND AND SUMMARY OF THE INVENTION

The invention relates to an automotive seat belt buckle pretensioner, and particularly to a mounting mechanism for a seat belt buckle pretensioner. The invention is especially applicable to seat belt pretensioners that employ pyrotechnic cartridges as the power source.

Seat belt buckle pretensioners employing explosive pyrotechnic gas generators as the power source are shown in U.S. Pat. Nos. 5,403,037 and 5,639,120. Typically, a seat belt buckle pretensioner comprises a pyrotechnic cartridge mounted in a housing that is suitably affixed to a concealed portion of the automotive seat structure. A cylinder extends from the housing for slidably supporting a small piston that is operatively connected to the seat belt buckle by a flexible cable that is trained around a pulley aligned with the aforementioned cylinder.

Should the automotive vehicle experience an abrupt deceleration, a sensor causes an electrical signal to be delivered to the pyrotechnic cartridge, which explosively generates a relatively high gas pressure against the piston. The piston slides rapidly along the cylinder to exert a pulling force on the cable; the cable travels downwardly around the pulley to draw the seat belt buckle angularly downwardly, so as to tension the associated seat belt.

In many cases there may be only a relatively small space within the automotive seat structure for operatively mounting the seat belt buckle pretensioner assembly. The present invention relates to a mounting mechanism for a seat belt buckle pretensioner assembly that is separate from the pretensioner componentry, whereby the mounting mechanism can be designed to fit different installation space requirements without requiring any redesign of the pretensioner components.

In preferred practice of the invention the mounting mechanism comprises a single bracket, stamped or otherwise formed, so that one wall of the bracket is attachable to the available mounting surface on the seat structure, while another wall structure is rigidly affixed to the mounting bracket to act as a mounting device for the operating componentry of the seat belt buckle pretensioner. The single mounting bracket can be reconfigured to meet different installation space requirements. The mounting bracket and associated wall structure are designed to form a protective enclosure for the pulley.

Further features of the invention will be apparent from the attached drawings and description of an illustrative embodiment of the invention.

DESCRIPTION OF A PREFERRED EMBODIMENT OF THE INVENTION

Figure 1:
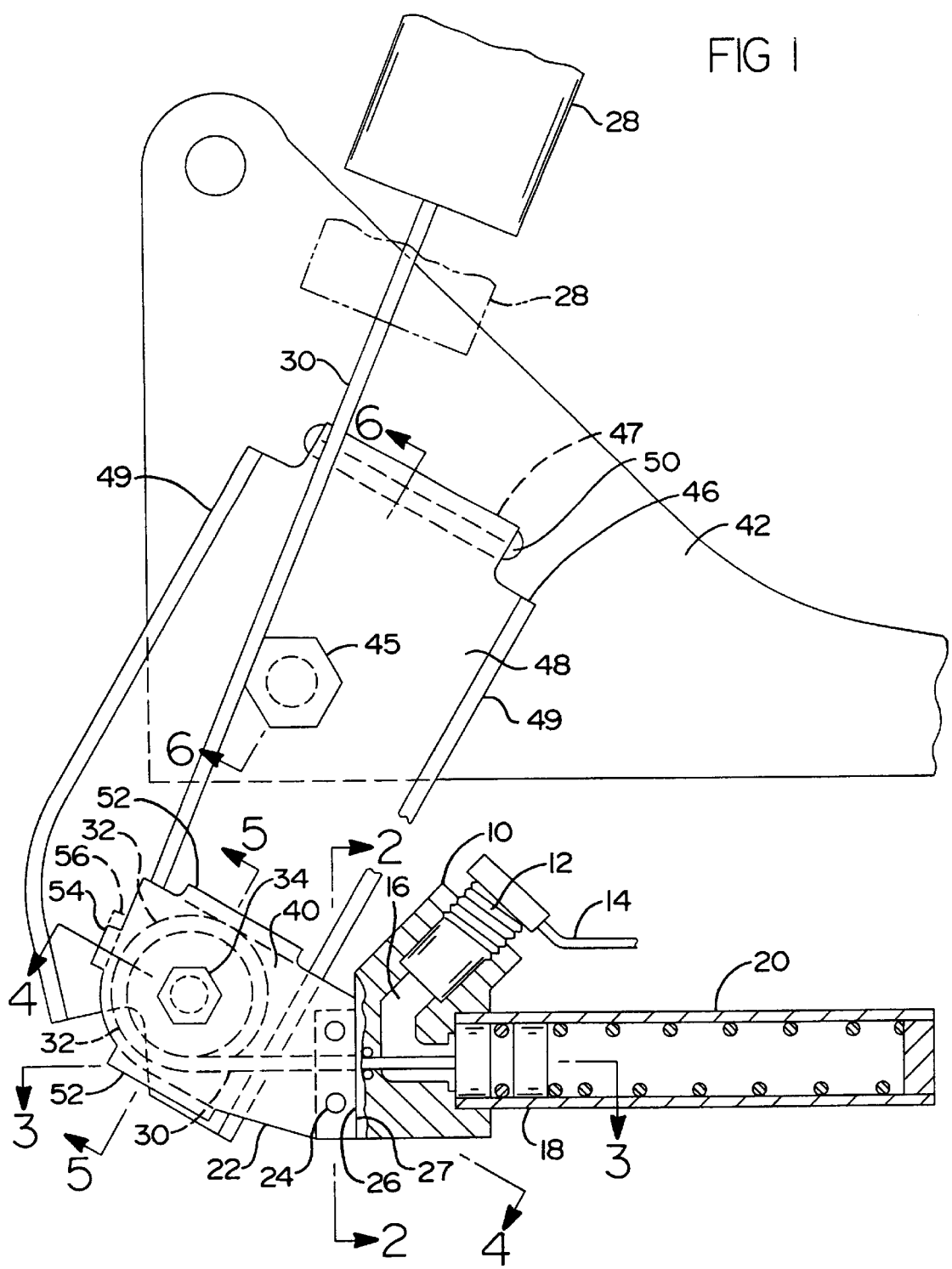
FIG. 1 is a side elevational view, with parts in section, showing a seat belt buckle pretensioner assembly embodying the invention.
Figure 2:
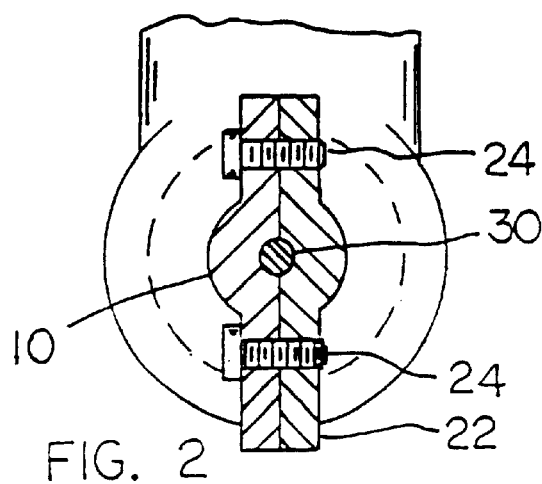
FIG. 2 is a sectional view taken online 2—2 in FIG. 1.
Figure 3:
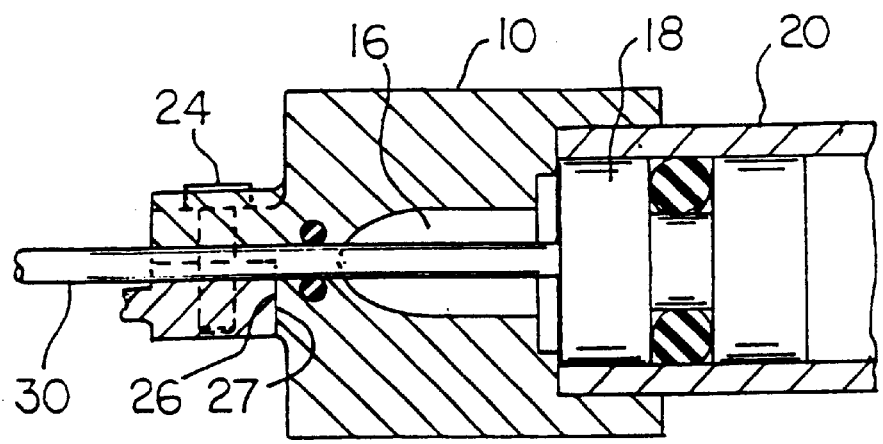
FIG. 3 is a sectional view taken on line 3—3 in FIG. 1.

The drawings show an automotive seat belt buckle pretensioner assembly adapted for installation on a structural member 42 of an automotive seat. The operating componentry used in the pretensioner assembly is generally conventional. The invention relates particularly to the mounting mechanism for the pretensioner assembly.

As shown, the seat belt buckle pretensioner comprises a housing 10 that supports a pyrotechnic gas generator cartridge 12 having a lead wire 14. When an electrical signal is delivered through lead wire 14 to the cartridge, the explosive mixture in the cartridge generates a high gas pressure that is channeled through passage 16 against the left face of a piston 18 that is slidably supported in an elongated cylinder 20 extending rightwardly from housing 10. Piston 18 moves rapidly within cylinder 20 in a left-to-right direction.

Housing 10 is affixed to a pulley support structure 22 by two screws 24 extending transversely through the housing into threaded holes in the bracket structure 22. Housing 10 has an external shoulder 26 that mates with edge 27 of pulley support structure 22, so as to augment the mounting force of screws 24.

Shoulder 26 is oriented to absorb the force on the housing associated with the explosive generation of gas by cartridge 12. As depicted in FIG. 1, the explosive force is directed within passage 16 downwardly and leftwardly at an angle of approximately forty five degrees to the horizontal. Shoulder 26 on housing 10 is oriented to absorb the explosive force. Screws 24 are used primarily to keep housing 10 in a fixed position on pulley support structure 22. The shoulder 26 on the housing abuts the associated edge of structure 22 to handle the explosive force.

A belt buckle 28 of conventional construction is operatively connected to piston 18 by a flexible cable 30. As shown in FIG. 1, cable 30 extends angularly downwardly from the belt buckle around a grooved pulley 32 and then horizontally to a fixed connection with piston 18.

Figure 4:
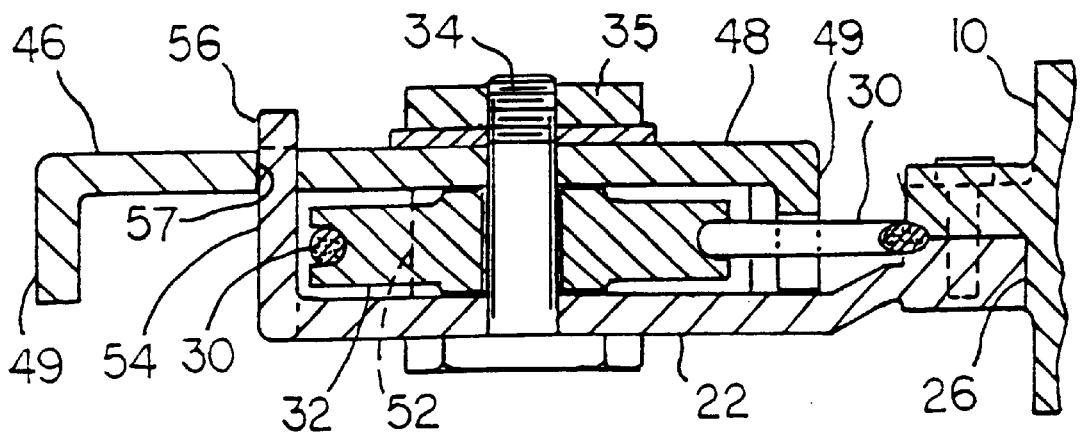
FIG. 4 is a sectional view taken on line 4—4 in FIG. 1.

A grooved pulley 32 is rotatably mounted on pulley support structure 22 by means of a bolt 34; the threaded shank of the bolt threads into a threaded nut 35 (FIG. 4). Pulley 32 redirects cable 30 so that left-to-right motion of piston 18 produces an oblique downward motion of buckle 28, with a consequent tensioning of the associated seat belt. As an alternative to bolt 34, the pulley can be mounted on structure 22 by means of a rivet. The shank of the bolt (or rivet) serves as a support shaft for the grooved pulley.

Figure 6:
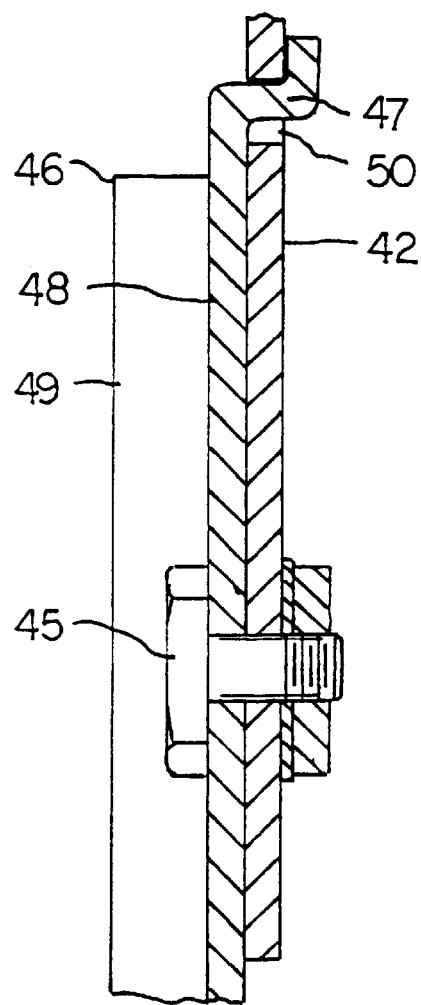
FIG. 6 is a sectional view taken on line 6—6 in FIG. 1.

Bolt 34 acts as a connector mechanism for affixing pulley support structure 22 to a mounting bracket 46. As shown in FIG. 6, bracket 46 includes a major wall 48 positioned flatwise against a vertical surface of the seat structural member 42. Bracket 46 further includes reinforcement flanges 49 extending right angularly from wall 48. Such flanges extend the full length dimension of bracket 46 to rigidify the bracket against bending or buckling.

Bracket 46 is attached to seat structure 42 by means of a single bolt 45 and a single locator flange 47. As shown in FIG. 6, flange 47 extends right angularly from wall 48 through a slot 50 in seat structure 42, so that when bolt 45 is trained through aligned holes in wall 48 and seat structure 22, flange 47 locates bracket 46 in a fixed position on the seat structure. Flange 47 prevents rotational displacement of bracket 46 on seat structure 22.

Figure 5:
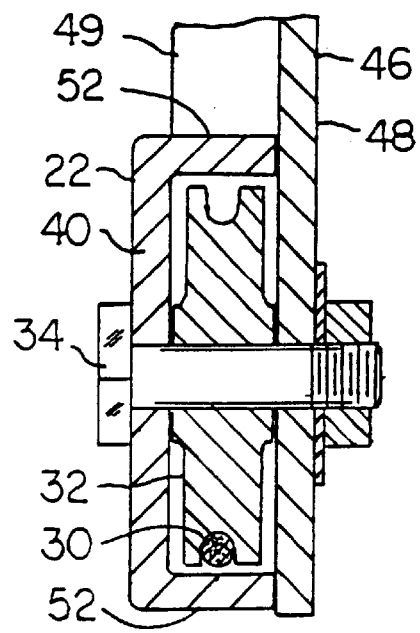
FIG. 5 is a sectional view taken on line 5—5 in FIG. 1.

Referring to FIGS. 1 and 5, pulley support structure 22 includes two flanges 52 extending right angularly from major wall 40 to abut wall 48 of bracket 46, thereby keeping walls 40 and 48 parallel. Such parallelism is necessary for the proper mounting of pulley 32.

As shown best in FIG. 4, pulley support structure 22 also includes a third flange 54 extending right angularly from wall 40 to abut wall 48 of bracket 46. A tab 56 extends from flange 54 through a locator slot 57 in wall 48, to prevent undesired rotation of pulley support structure 22 around the axis of bolt 34. Tab 56 properly locates pulley support structure 22 on bracket 46.

Flanges 54 and 52 abut wall 48 of bracket 40 to maintain wall 40 in parallelism with wall 48. Flange 54 is located in near proximity to the outer edge of pulley 32, to prevent inadvertent dislocation of cable 30 from the pulley.

It will be seen from FIGS. 1 and 4 that walls 40 and 48 partially enclose pulley 32, so that pulley 32 is shielded from contact with any objects that might be placed near the seat structure. Pulley 32 is thus free to rotate in the desired manner, e.g. when an electrical signal is delivered to gas generator cartridge 12. Walls 40 and 48 support bolt (or rivet) 34 at spaced points on either side of the pulley so as to provide a strong support action for the pulley. The pulley is not likely to wobble or malfunction when subjected to shock forces.

During an emergency situation seat belt buckle 28 is required to travel downwardly a predetermined distance (or stroke) to produce the desired belt tension. Typically the stroke distance is about one hundred millimeters. The normal (starting) position of buckle 28 can vary, depending on different model vehicles and model years. To achieve a suitable starting position of buckle 28, mounting bracket 46 can be mounted in different locations on seat structure 22. FIG. 1 shows in dashed lines buckle 28 in one lowered position.

By mounting bracket 46 in a higher position on seat structure 22, it is possible to adjust the starting (normal) position of buckle 28 upwardly. By mounting bracket 46 in a lower location on seat structure 22, it is possible to adjust the normal position of buckle 28 downwardly (from the full line position).

Adjustment, or relocation of bracket 46 can be accomplished by changing the bracket 46 length dimension, or by changing the location of the bolt hole and slot in seat structure 42. In some cases the adjustment can be achieved by changing both the bracket dimension and the hole-slot locations in structure 42.

Bracket 46 is separate from the operating components 10, 22, 28, and 30. Bracket 46 can be redesigned or relocated on seat structure 42 without having to redesign the operating components. This is advantageous from a manufacturing viewpoint, in that a standard proven operating system can be used on a range of different automotive vehicles (and model years) merely by varying the mounting bracket geometry or location.

What is claimed is:

1. An automotive seat belt buckle pretensioner assembly comprising:

a mounting bracket (46);

a pulley support means (22) secured to said mounting bracket;

said mounting bracket comprising a first major wall (48);

said pulley support means comprising a second major wall (40) extending parallel to said first major wall;

a pulley (32) located between said first and second major walls, whereby said major walls act as protective shields for said pulley; a pulley support shaft (34) extending between said major walls for rotatably supporting said pulley;

a seat belt buckle (28);

a pyrotechnic power means (10) secured to said pulley support means, said pyrotechnic power means comprising a cylinder (20) and a piston slidably positioned in said cylinder; and a flexible cable extending from said buckle around said pulley to said piston;

said mounting bracket having a single mounting hole (at 45) extending through said first major wall, and a single locator flange (47) extending from said first major wall at a point remote from said pulley support shaft;

said mounting hole being located between said locator flange and said pulley support shaft.

2. An automotive seat belt buckle pretensioner assembly comprising:

a mounting bracket (46);

a pulley support means (22) secured to said mounting bracket;

said mounting bracket comprising a first major wall (48), and two reinforcement flanges (49) extending angularly from said first major wall toward said pulley support means;

said pulley support means comprising a second major wall (40) extending parallel to said first major wall;

a pulley (32) located between said first and second major walls, whereby said major walls act as protective shields for said pulley; a pulley support shaft (34) extending between said major walls for rotatably supporting said pulley;

a seat belt buckle (28);

a pyrotechnic power means (10) secured to said pulley support means, said pyrotechnic power means comprising a cylinder (20) and a piston slidably positioned in said cylinder; and a flexible cable extending from said buckle around said pulley to said piston;

one of said reinforcement flanges (49) abutting said second major wall; said second major wall having plural flanges (52, 54) abutting said first major wall to maintain a parallel relationship between said first and second major walls.

3. An automotive seat belt buckle pretensioner assembly comprising:

a mounting bracket (46);

a pulley support means (22) secured to said mounting bracket;

said mounting bracket comprising a first major wall (48);

said pulley support means comprising a second major wall (40) extending parallel to said first major wall;

a pulley (32) located between said first and second major walls, whereby said major walls act as protective shields for said pulley; said second major wall having plural flanges (52, 54) abutting said first major wall, whereby said flanges act as spacers to maintain a parallel relation between said first and second major walls;

said first and second major walls having aligned bolt holes; a bolt extending through said aligned holes for securing said pulley support means to said mounting bracket; said pulley being rotatably mounted on said bolt;

said first major wall having a locator slot (57) spaced from the associated bolt hole by a distance slightly greater than the radius of said pulley; one of said flanges having a tab (56) extending through said locator slot, whereby said pulley support means is anchored to said mounting bracket by the cooperative action of said bolt and said tab;

a seat belt buckle (28);

a pyrotechnic power means (10) secured to said pulley support means, said pyrotechnic power means comprising a cylinder (20) and a piston slidably positioned in said cylinder; and a flexible cable extending from said buckle around said pulley to said piston.

\* \* \* \* \*